United States Patent Office 2,888,312
Patented May 26, 1959

2,888,312
VAT DYESTUFF MIXTURES

Jacques Wegmann, Basel, Walter Kern, Sissach, and Walter Jenny, Reinach, Switzerland, assignors to Ciba Limited, Basel, Switzerland, a Swiss firm No Drawing. Application July 15, 1954
Serial No. 443,696

Claims priority, application Switzerland July 22, 1953

8 Claims. (Cl. 8—28)

This invention provides new dyestuff preparations which contain at least two vat dyestuffs which are of similar constitution but are not isomeric with one another and contain at least one anthraquinone nucleus.

As dyestuffs of similar constitution there are to be understood, more especially, those which contain the same vattable radicals, including at least one anthraquinone radical, and also contain substantially the same ring system, so that the dyestuffs differ from one another essentially only by the presence or absence of substituents suitable for vat dyestuffs or by the differences in such substituents. Thus the dyestuffs are of different empirical formula and consequently as a rule of different molecular weight. As such substituents there may be mentioned, for example, halogen atoms, namely fluorine, chlorine, bromine and iodine, alkyl or alkoxy groups of low molecular weight, dialkyl sulfonic acid amide groups and alkyl sulfone groups.

The preparations may contain, for example, 1:5-di-(acylamino)-anthraquinones, and especially valuable are 1:4-di-(acylamino)-anthraquinones. The acyl radicals in these compounds are advantageously those of carboxylic acids of the benzene series. In this connection benzoyl radicals are advantageously substituted, at least partially in the manner indicated above. Of special interest are 1:4-di-(acylamino)-anthraquinones substituted by sulfonic acid amide or alkyl sulfone groups. There are various ways in which these substituents may be distributed between the vat dyestuffs. Thus, for example, one of the two dyestuffs may contain two unsubstituted benzoyl radicals and the other may contain an unsubstituted and a substituted benzoyl radical or may contain two benzoyl radicals substituted in the same or different ways. Furthermore, each of the two dyestuffs may contain an unsubstituted and a differently substituted benzoyl radical. Finally, one dyestuff may contain an unsubstituted and a substituted benzoyl radical and the other may contain two substituted benzoyl radicals. The anthraquinone nucleus may also contain substituents; however, di-(acylamino)-anthraquinones which are not further substituted in the anthraquinone nucleus are advantageous as they are more easily obtained.

Especially favorable results can be produced with preparations of the above kind which contain two dyestuffs present in a molecular ratio ranging from 3:1 to 1:3, and advantageously in a molecular ratio of about 1:1.

Among the preparations of the composition described above there are included, for example, physical dyestuff mixtures obtainable in the usual manner. These mixtures can easily be converted into a new form, which possesses unexpected properties which differ considerably from those which would be expected as the result of simple mixing. The constitution of this new form is not known. Possibly a molecular compound may be formed similar to the phenomenon supposed to occur in the case of quinhydrones. Or it may also be possible that, owing to the presence of the one kind of dyestuff molecule a state of polarization, for example a limiting structure concerning the distribution of electrons, is brought about or stabilized in the other kind of dyestuff molecule or in both, which structure otherwise would not be possible. Although strict stoichiometric proportions are not necessary, the term "molecular compound" will also be used for such cases in the following description. The invention also includes the production of such hypothetical molecular compounds, independent of the substratum to be dyed, which contain at least two vat dyestuff molecules of similar constitution but not isomeric with one another, and which dyestuffs contain at least one anthraquinone nucleus. The production is advantageously carried out with mixtures of preparations having the constitution described above, but may, if desired, be carried out in another manner. On the other hand, these preparations may contain the dyestuffs in the form of molecular compounds.

The conversion of the differing dyestuffs into molecular compounds may be carried out in substance or on the fiber, it being assumed that these compounds contain bound together one molecule of each of two different dyestuffs or an at least not very different number of molecules of two different dyestuffs. In either case this conversion is advantageously prepared for or carried out by converting the dyestuff mixture from the reduced condition to the stable keto-form. If the conversion has not taken place it can easily be brought about in a simple manner, for example, by soaping at the boil the dyestuffs fixed on the fiber or by treating the dyestuffs in substance with suitable solvents or diluents. It must however be emphasized that the latter treatment in substance of ordinary physical mixtures of two such dyestuffs does not lead to molecular compounds.

For converting the dyestuffs into molecular compounds on the fiber these dyestuffs are fixed on suitable materials, especially cellulose-containing fibers, by known dyeing or printing methods, it being highly probable that the customary measures for finishing dyeings and prints by these methods, for example, hot soaping of the dyed material, bring about the conversion. Thus, cellulose-containing materials may be dyed by the usual dyeing methods, for example, from alkaline baths containing sodium hydrosulfite or with alkali salts of acid sulfuric acid esters of the leuco-compounds, or they may be printed by the known method of printing with the addition of potassium carbonate. For finishing the dyeings or prints there also comes into consideration, instead of soaping, a treatment with sulfonic acid amides, especially toluene sulfonic acid amides, or with other suitable substances (see Textilrundschau, vol. 8, page 97 et seq. (1953)).

The conversion of the dyestuffs into molecular compounds causes unexpected and technically valuable changes in the properties of the dyestuffs. As in the case of simple mixing it would be expected, since the dyestuffs are of similar constitution and therefore in most cases the tints of their dyeings would be similar, that the mixed tint would lie between the tints of the individual components, and that dulling of the mixed tint as compared with the tints of the components would occur to a greater or less extent than is usual in the case of mixtures. However, it has been unexpectedly found that the tint produced with the molecular compound is generally at least as pure as the tint produced by the component which yields the purer tint, and also in some cases a strongly bathochromic action occurs, that is to say, the tint produced with the molecular compound is, for example, shifted in a bathochromic direction with respect to the tint produced with the component which dyes the bluer shade. As, moreover, the properties of fastness are not more inferior than would be expected in the case of the components of a mixture, and in some cases, there may even be an improvement in the properties of fastness, especially the fastness to light, the preparations and process of the invention undoubtedly constitute a valuable advance in the art.

The following examples illustrate the invention, the parts and percentages being by weight:

*Example 1*

Equimolecular proportions of 1:4-dibenzoylamino-anthraquinone and 1 - (4' - dimethylsulfonamidobenzoyl-amino)-4-benzoylamino-anthraquinone are mixed together to form a homogeneous powder. 1 part of the mixture is pasted with 10 parts of a solution of Turkey red oil of 10 percent strength, and introduced into 90 parts of water. 4 parts of caustic soda solution of 30 percent strength and 2 parts of sodium hydrosulfite are then added. After allowing the vat to stand at 50° C. for 10 minutes it is introduced into a dyebath consisting of 1400 parts of water which contain 3 parts of caustic soda solution of 30 percent strength, 2 parts of sodium hydrosulfite and 50 parts of sodium chloride.

50 parts of a viscose fabric are entered into the dyebath and dyeing is carried on at about 30° C. for ¾ hour. The dyeing is then squeezed, oxidized in the air and after-treated at the boil for ½ hour in a bath containing 0.3 percent of soap. There is obtained a beautiful violet dyeing having very good properties of fastness, whereas the first of the two dyestuffs mentioned above when used alone yields a dull red-orange dyeing while the second mentioned dyestuff yields a brilliant red dyeing.

By replacing the second mentioned dyestuff by 1:4-bis-(dimethylsulfonamidobenzoylamino)-anthraquinone, a pure bright red dyeing is produced on cotton, whereas the individual components used alone each yield a dull brown-orange dyeing.

By replacing in this example the first mentioned dyestuff by the dyestuff mentioned in the preceding paragraph, there is obtained a considerably more brilliant red dyeing which likewise does not correspond to the expected mixed shade.

By replacing the second mentioned dyestuff by 1-(4'-dimethylsulfonamidobenzoylamino)-4-(2'-chlorobenzoylamino)-anthraquinone, there is obtained a violet dyeing, whereas the components used separately yield brown-orange tints.

By using instead of an equimolecular mixture, a different mixing ratio and using for 1 molecular proportion of 1:4-dibenzoylamino-anthraquinone 2 or 3 molecular proportions of 1-(4'-dimethylsulfonamidobenzoylamino)-4-(2'-chlorobenzoylamino)-anthraquinone, there is obtained a violet shade which is practically identical with that produced with the equimolecular mixture.

By using instead of equimolecular proportions of the dyestuffs as described in the first paragraph of this example, different relative proportions, for example, 2 molecular proportions of the first mentioned dyestuff and 1 molecular proportion of the second mentioned dyestuff or 1 molecular proportion of the first mentioned and 2 or 3 molecular proportions of the second mentioned dyestuff, there are obtained in all cases violet shades which do not differ appreciably from the shade obtained with the equimolecular mixture.

By using equimolecular quantities of 6:7-dichloro-1:4-dibenzoylamino-anthraquinone and 6:7-dichloro-1:4-bis-(dimethylsulfonamido - benzoylamino) - anthraquinone which dyestuffs separately yield dull blue-red shades, there is obtained a strong bright Bordeaux tint, which is more yellowish than the shades produced by the separate components.

*Example 2*

5 parts of the sodium salt of the leuco sulfuric acid ester of each of the dyestuffs mentioned in the first paragraph of Example 1 are dissolved in 1000 parts of water, 10 parts of sodium nitrite and 50 parts of sodium chloride are added, and 50 parts of a viscose fabric is impregnated with the resulting solution for ½ hour at 30–40° C. The material is then squeezed well and developed for 10 minutes in a bath which contains, per liter, 10 cc. of concentrated sulfuric acid. There is obtained a brown-orange dyeing which is developed to a beautiful violet tint when soaped at the boil.

Sulfuric acid is run into a solution prepared in the manner described above until the whole of the dyestuff is oxidized and precipitated. The red-brown powder is filtered off with suction, washed, dried and ground with alcohol. In this manner it is converted into a violet pigment, whereas a mixture of the two separately precipitated dyestuffs yields a red-brown pigment.

*Example 3*

Equimolecular proportions of 1:4 - bis - (4' - methyl-sulfone - benzoylamino) - anthraquinone and 1:4 - dibenzoyl-amino-anthraquinone are mixed together, and a part of the resulting mixture is used for dyeing cotton in the manner described in Example 1, whereby a claret red dyeing is produced, whereas the separate components yield a vermilion dyeing and a brown-red orange dyeing, respectively.

By replacing the second component by 1:4-bis-(4' - dimethylsulfonamidobenzoylamino) - anthraquinone, there is obtained a yellowish pink tint which is considerably purer than could be expected from the tints produced with the separate components.

By replacing the first mentioned dyestuff by 1-(4'-isopropyl - sulfone - benzoylamino) - 4 - benzoylamino-anthraquinone, the mixture so obtained also yields a claret red tint, whereas the two components separately yield a brown-orange tint.

*Example 4*

Equimolecular proportions of 1:4 - bis - (4' - dimethylsulfonamidobenzoylamino) - anthraquinone and 1-(4'-methylsulfone-benzoylamino) - 4 - benzoylaminoanthraquinone are mixed together and the mixture is used for dyeing in the manner described in Example 1. There is obtained a pure brilliant scarlet dyeing, whereas the first mentioned dyestuff yields alone a dull brown-red dyeing and the second a claret red dyeing.

By replacing the second mentioned dyestuff by the analogous meta-methyl-sulfone derivative, which yields alone a caret red dyeing, there is also obtained a pure scarlet dyeing.

By replacing in both mixtures the first mentioned dyestuff by 1:4-dibenzoylaminoanthraquinone, which yields alone a brown-orange dyeing, violet tints are produced in both cases.

*Example 5*

100 parts of each of the dyestuffs mentioned in paragraph 1 of Example 1 are stirred in the form of a paste of 10 percent strength into 600 parts of a thickening of the following composition:

90 parts of wheat starch,
90 parts of cold water,
100 parts of glycerine,
140 parts of British gum,
170 parts of tragacanth thickening (60/1000)
170 parts of potassium carbonate.

The mixture is made up to 1000 parts by the addition of 240 parts of water, and boiled until the mass is homogeneous.

To the printing color are added 150 parts of formaldehyde sulfoxylate and 50 parts of water. A viscose fabric is printed with the resulting printing color on a roller printing machine, dried and steamed for 10 minutes at 101–103° C. in steam free from air. The material is then rinsed for a short time nad oxidized for 5 minutes in a bath at 60° C., which contains, per liter, 3 grams of sodium perborate and 2 grams of glacial acetic acid. The material is then rinsed and after-treated for ¼ hour at the boil in a soap solution of 0.3 percent strength. There is obtained a strong pure violet print having very good properties of fastness.

By printing a fabric of cotton or staple fibers of regenerated cellulose in the same manner equally good results are obtained.

By using, instead of the second mentioned dyestuff, 1 - (4' - dimethylsulfonamido - benzoylamino) - 4 - (4'-chlorobenzoylamino) - anthraquinone and otherwise proceeding as described above, somewhat yellower Bordeaux red prints are obtained which also have an excellent fastness to light and washing.

By replacing in the procedure of the preceding paragraph and of the first and second paragraphs of this example the first mentioned dyestuff by 1:4-bis-(4'-dimethylsulfonamidobenzoylamino) - anthraquinone, there is obtained in each case a scarlet tint which is yellower, purer and stronger than the tints of the prints obtained with the separate components.

The same result is obtained by replacing the bis-(dimethylsulfonamido) - derivative by 1:4 - bis - (methylsulfone-benzoylamino)-anthraquinone, in that a yellower and purer print is likewise produced.

By combining the last mentioned bis-dimethylsulfonamido derivative or sulfone derivative with an equimolecular proportion or the same proportion by weight of 1:4 - dibenzoylaminoanthraquinone, which when used alone yields a brown-red tint, there are obtained prints which are distinguished by a strong shift in color, in that violet shades which are fast to washing and light are produced.

By using equimolecular proportions of 1 - (3' - methyl - sulfone - benzoylamino) - 4 - benzoylaminoanthraquinone and 1:4 - bis - (4' - isopropyl - sulfone - benzoylamino)-anthraquinone, and otherwise proceeding in the manner described above, there is obtained a scarlet red print which is very considerably yellower and purer, especially in comparison with the tints obtained with the first mentioned component.

The same is true of the combination of 1 - (4' - methyl - sulfone - benzoylamino) - 4 - benzoylamino-anthraquinone with 1:4 - bis - (4' - dimethylsulfonamidobenzoylamino) - anthraquinone which likewise yields a scarlet tint, although the first mentioned component alone yields Bordeaux red prints.

*Example 6*

178 parts of 1:4-dibenzoylaminoanthraquinone and 235 parts of 1-(4' - dimethylsulfonamidobenzoylamino)-4 - (4' - chlorobenzoylamino) - anthraquinone are stirred in 413 parts of sulfuric acid of 80 percent strength at 0° C. Stirring is continued for one hour at 0–5° C. until dissolution is complete, and ice is then added until the dyestuff has precipitated out. The whole is then poured into ice water, and the precipittae is filtered off with suction and washed free from acid.

The red-brown powder so obtained is dried over calcium chloride under reduced pressure.

1 part of the red-brown powder is ground with alcohol, whereupon it immediately becomes violet. The alcohol is removed in vacuo, and the violet powder is finally ground with the addition of the same weight of dinaphthyl-methane disulfonic acid and 8 parts of water. In this manner there is obtained an aqueous paste of 10 percent strength which is stirred into a viscose spinning composition.

After the spinning operation there is obtained a violet colored viscose, whereas the use of the separate components in an analogous manner results in red-brown and red tints, respectively.

On the other hand, a scarlet dyeing is obtained by using equimolecular proportions of 1:4-di-(4'-sulfonamidobenzoylamino)-anthraquinone and 1-(4'-dimethylsulfonamidobenzoylamino)-4-(4' - chlorobenzoylamino)-anthraquinone and otherwise proceeding in the manner described above.

*Example 7*

Viscose is dyed in the manner described in Example 1 with a mixture of 1 part of 1:5-di-(4'-chlorobenzoylamino)-anthraquinone and 1 part of 1:5-di-(4'-dimethylsulfonamidobenzoylamino)-anthraquinone. There is produced a strong pure yellow tint having excellent properties of fastness.

By using instead of the first mentioned dyestuff, the same quantity of 1:4-dibenzoylaminoanthraquinone, there is produced a yellow-brown tint likewise possessing excellent properties.

What is claimed is:

1. A process for the production of molecular compounds of vat dyestuffs, which comprises converting from the reduced condition into the stable keto-form a mixture of at least two vat dyestuffs not isomeric with one another and both corresponding to the formula

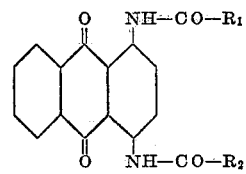

in which $R_1$ and $R_2$ each represents a benzene radical and at least one of the radicals $R_1$ and $R_2$ of at least one dyestuff is substituted by a member selected from the group consisting of alkylsulfone and dialkylsulfonamide groups.

2. A process for coloring textile material which comprises coloring the material by a method suitable for vat dyestuffs with at least two vat dystuffs not isomeric with one another and both corresponding to the formula

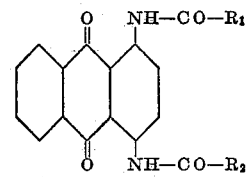

in which $R_1$ and $R_2$ each represents a benzene radical and at least one of the radicals $R_1$ and $R_2$ of at least one dyestuff is substituted by a member selected from the group consisting of alkylsulfone and dialkylsulfonamide groups.

3. A dyestuff preparation which contains at least two vat dyestuffs not isomeric with one another and both corresponding to the formula

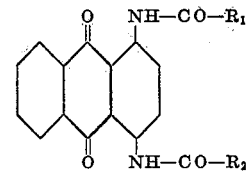

in which $R_1$ and $R_2$ each represents a benzene radical and at least one of the radicals $R_1$ and $R_2$ of at least one dyestuff is substituted by a member selected from the class consisting of alkylsulfone and dialkylsulfonamide groups.

4. A dyestuff preparation which contains the two vat dyesuffs of the formulae

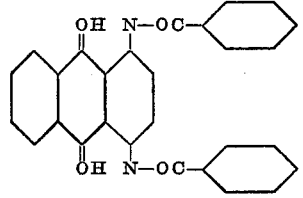

and

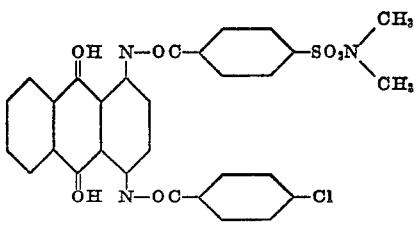

5. A dyestuff preparation which contains the two vat dyestuffs of the formulae

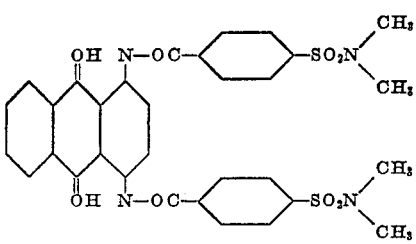

and

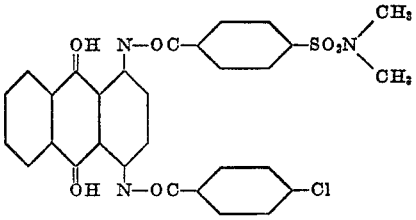

6. A dyestuff preparation which contains the two vat dyestuffs of the formulae

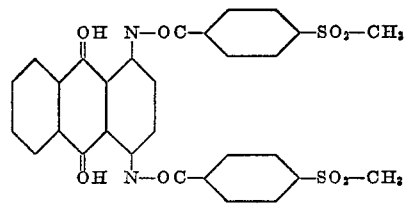

and

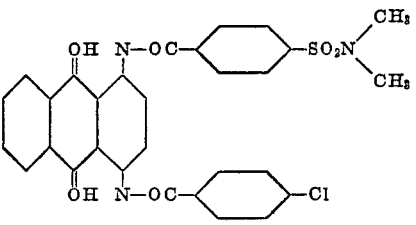

7. A dyestuff preparation which contains the two vat dyestuffs of the formulae

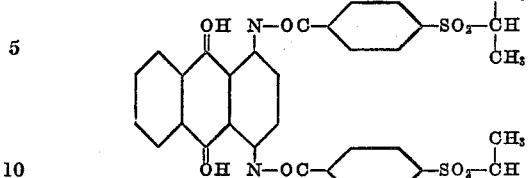

and

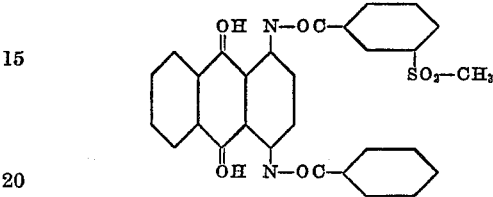

8. A dyestuff preparation which contains the two vat dyestuffs of the formulae

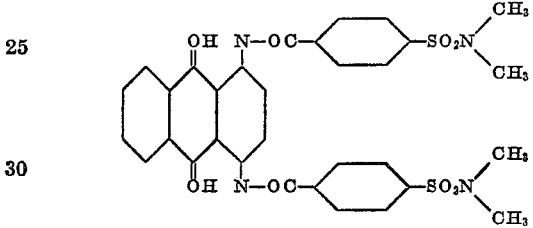

and

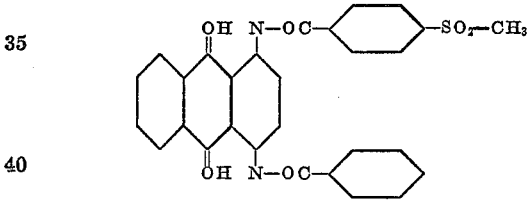

References Cited in the file of this patent
UNITED STATES PATENTS

| | | |
|---|---|---|
| 2,053,041 | Mueller | Sept. 1, 1936 |
| 2,060,186 | Felix | Nov. 10, 1936 |
| 2,150,092 | Beard | Mar. 7, 1939 |
| 2,342,191 | Grossmann | Feb. 22, 1944 |
| 2,485,197 | Grossmann | Oct. 18, 1949 |
| 2,506,020 | Grossmann | May 2, 1950 |
| 2,768,183 | Hoefle | Oct. 23, 1956 |

OTHER REFERENCES

"Synthetic Dyes," by K. Venkataraman, vol. 2, pp. 890, 889, 916, 895–898, 881, 864; pub. N.Y.C. by Academic Press, 1952.

UNITED STATES PATENT OFFICE
Certificate of Correction

Patent No. 2,888,312 May 26, 1959

Jacques Wegmann et al.

It is hereby certified that error appears in the printed specification of the above numbered patent requiring correction and that the said Letters Patent should read as corrected below.

Column 4, line 47, for "caret" read —claret—; line 74, for "nad" read —and—; column 5, line 57, for "precipittae" read —precipitate—; column 6, lines 68 to 75, column 7, lines 4 to 9, lines 15 to 21, lines 27 to 33, lines 37 to 45, lines 48 to 55, column 8, lines 4 to 10, lines 13 to 20, lines 25 to 30, and lines 35 to 40, the left-hand portion of the formulas, each occurrence, should appear as shown below instead of as in the patent—

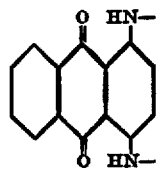

Signed and sealed this 14th day of June 1960.

[SEAL]

Attest:
KARL H. AXLINE,
Attesting Officer.

ROBERT C. WATSON,
Commissioner of Patents.